United States Patent

Nagao et al.

[11] Patent Number: 5,990,649
[45] Date of Patent: Nov. 23, 1999

[54] CONTROL DEVICE FOR QUICK ANGLE ADJUSTMENT OF REARVIEW MIRROR

[75] Inventors: Mitsuyoshi Nagao, Fujieda; Hiroshi Teramoto, Yaizu, both of Japan

[73] Assignee: Murakami Corporation, Shizuoka-ken, Japan

[21] Appl. No.: 09/100,620

[22] Filed: Jun. 19, 1998

[30] Foreign Application Priority Data

Jul. 1, 1997 [JP] Japan ................................ 9-188937

[51] Int. Cl.⁶ ............................... B60R 1/06; G02B 5/08
[52] U.S. Cl. ..................... 318/568.1; 318/603; 318/565; 318/466; 350/637
[58] Field of Search ............................ 318/10, 560–696, 318/466; 350/637, 606, 632, 634; 359/872, 873, 874, 876, 877; 248/480, 487; 74/89.12, 89.15

[56] References Cited

U.S. PATENT DOCUMENTS

| | | | |
|---|---|---|---|
| 4,267,494 | 5/1981 | Matsuoka et al. | 318/568 |
| 4,682,088 | 7/1987 | Sullivan | 318/568 |
| 4,936,671 | 6/1990 | Kaspar | 350/637 |
| 5,226,034 | 7/1993 | Nagayama et al. | 359/873 |
| 5,343,333 | 8/1994 | Nagayama et al. | 359/874 |

FOREIGN PATENT DOCUMENTS

| | | |
|---|---|---|
| 09220977 | 8/1997 | Japan . |
| 09301071 | 11/1997 | Japan . |
| WO 95/05293 | 2/1995 | WIPO . |

*Primary Examiner*—Paul Ip
*Attorney, Agent, or Firm*—Micheal J. Striker

[57] ABSTRACT

In a control device for quick angle adjustment of a rearview mirror for a vehicle of the present invention, a reversible switch is connected in the forward direction only when an operational switch for quick angle adjustment is operated after a shift lever is displaced to a reverse gear position. This rotates a quick angle adjusting motor to tilt a mirror angle of the mirror assembly to a reverse position. The mirror angle does not change automatically to the reverse position when the reverse gear is selected merely to reverse a vehicle. Accordingly, change of the mirror angle against the driver's intention can be avoided. When a tilt angle of the mirror is at the reverse position, the reversible switch can be connected in the reverse direction by means of displacing the shift lever from the reverse gear position to any other position or by means of turning OFF the operational switch for quick angle adjustment, which enables the mirror to return to its normal position easily, positively and radically. Accordingly, the tilt angle of the mirror can be changed easily and accurately, which proves the highly improved operation.

6 Claims, 5 Drawing Sheets

| INPUT | | | | OUTPUT | |
|---|---|---|---|---|---|
| CLOCK | DATA | SET | RESET | $Q_{n+1}$ | $\overline{Q}_{n+1}$ |
| ↗ | L | L | L | L | H |
| ↗ | H | L | L | H | L |
| ↘ | × | L | L | $Q_n$ | $\overline{Q}_n$ |
| × | × | L | H | L | H |
| × | × | H | L | H | L |
| × | × | H | H | H | H |

FIG. 6

CONTROL DEVICE FOR QUICK ANGLE ADJUSTMENT OF REARVIEW MIRROR

BACKGROUND OF THE INVENTION

1. Field of Invention

The present invention relates to a rearview mirror assembly with a quick angle adjusting function to change a tilt angle of a rearview mirror quickly and radically to make the vicinity of a rear wheel part visible, for example, in case of putting a vehicle into a garage. More specifically, the present invention relates to a technique for easy, accurate and radical adjustment of the tilt angle of the rearview mirror.

2. Description of the Prior Art

Rearview mirror assemblies for the vehicle, such as door mirrors and fender mirrors, are typically equipped with an angle adjusting mechanism so as to adjust a tilt angle of the mirror by means of remote control operation. For this purpose, pivots are mounted on vertical and transversal axes, respectively, on the backside of the mirror in a movable manner. Thereby, pivots make advancing/retracting action according to rotation of a motor for adjusting the mirror angle, so that the mirror can be tilted in all directions up/down and right/left.

For example, when backing a vehicle into a garage, it is desirable to reflect the vicinity of a rear wheel part in the rearview mirror. However, in order to obtain this position of the rearview mirror, an adjusting button of the angle adjusting mechanism must be depressed continuously, thereby a mirror angle is tilted at a large degree. In addition an operation to return the mirror angle to its normal position is required after the vehicle is in place in the garage.

In order to eliminate such a bothering operation, a quick angle adjusting mechanism has been in practice for rearview mirror assemblies. In the quick angle adjusting mechanism, the fact that a motor for the quick angle adjustment is provided in a mirror frame separately from one for the mirror angle adjustment means that the mirror angle is tilted quickly and thus can be adjusted so as to reflect the vicinity of the rear wheel part of the vehicle in response to the activation of an operational switch for the quick angle adjustment. In other words, turning ON this switch before putting the vehicle into the garage, the inclination of the mirror is adjusted quickly to reflect the vicinity of the rear wheel part of the vehicle, which enables the if driver to move his or her vehicle into the garage easily and safely while the inclination of the mirror can be returned to its normal position by turning OFF the switch after the vehicle is in place in the garage.

Meanwhile, with the quick angle adjusting switch that is a simple mechanical ON/OFF switch, the inclination of the mirror is changed whenever the switch is turned on. For example, accidental activation of the quick angle adjusting switch comes to move the mirror to reflect the vicinity of the rear wheel part even if a drive gear is selected (or a reverse gear is not selected). Consequently, the driver cannot get proper rearview visibility, deteriorating the safety of driving.

It has been proposed a method to change the inclination of the mirror in association with a reverse gear of a vehicle in view of avoiding such a trouble. That is, in the method, an operational switch for quick angle adjustment is turned ON automatically in response to switching of a shift lever of a vehicle to the reverse gear, which causes the change of the mirror inclination so as to obtain a view of the vicinity of a rear wheel part. In this method, however, the inclination of the mirror changes whenever the shift lever is engaged with the reverse gear even when the driver doesn't want to do so.

Furthermore, in order to solve the above-mentioned problems, it is known that an operational switch for quick angle adjustment has been provided in which the operational switch is being cooperated with the reverse gear so that the inclination of the mirror is quickly tilted to reflect the vicinity of the rear wheel part only when the shift lever is engaged with the reverse gear and the operational switch for the quick angle adjustment is turned ON. Even with this technique, the same problem arises as mentioned above due to the fact that the inclination of the mirror changes in association with the operation of the shift lever in case the operational switch for quick angle adjustment is left ON.

That is to say, the quick angle adjusting mechanism can be activated when the driver selects the reverse gear and turns ON the operational switch for quick angle adjustment, the driver, however, may fail to turn OFF the operational switch for quick angle adjustment after returning the mirror to its normal position. Even under such circumstances, displacement of the shift lever from the reverse gear to another position can return the mirror to its normal position. However, because the operational switch for quick angle adjustment is kept in the ON state, once the reverse gear is selected, the quick angle adjusting mechanism operates in response to that so that the inclination of the mirror comes to change. Thus, the quick angle adjusting mechanism operates against the drive's intention, which annoys him or her.

As described above, conventional remote control devices for quick angle adjustment of a vehicle rearview mirror may provide automatic operation of the quick angle adjusting mechanism in association with the reverse gear. Alternatively, the devices may activate the quick angle adjusting mechanism when the reverse gear is selected and the operational switch for quick angle adjustment is turned ON. In any case, the inclination of the mirror maybe changed against the driver's intention, which annoys him or her.

An object of the present invention is to provide a remote control device for quick angle adjustment of a vehicle rearview mirror in which the device is easy to operate and is capable of ensuring accurate operation of a quick angle adjusting mechanism only when required.

SUMMARY OF THE INVENTION

In a preferred embodiment according to the present invention, a remote control device for quick angle adjustment of a vehicle rearview mirror detects displacement of a shift lever to a reverse gear, which allows a transistor Tr1 to turn on. When an operational switch for quick angle adjustment S2 turns on with the transistor Tr1 ON, a transistor Tr2 then turns on and a transistor Tr3 also turns on instantaneously. In response to this, a thyristor SCR turns on and is retained ON after the transistor Tr3 turns off. As a result, since a first relay circuit RL1 comes to conduct, a forward current flows through a motor for quick angle adjustment so that the inclination of the mirror tilts to a position that makes the vicinity of a rear wheel part visible (hereinafter this position is referred to as a reverse position). When the operational switch for quick angle adjustment S2 turns off or when the shift lever is displaced out of the reverse gear position, the first relay circuit RL1 stops conducting, which results that a reverse current flows through the motor for quick angle adjustment, and thus the mirror returns to its normal position.

When the shift lever is displaced from a drive gear to a back gear with the switch S2 conducting, the transistors Tr1 and Tr2 both turn on while the transistor Tr3 does not turn on instantaneously. Subsequently, the thyristor SCR does not turn on, the first relay circuit RL1 is not conducted and the mirror is prevented from being inclined to the reverse position. In other words, the mirror is left in its normal position even when a driver displaces the shift lever from the driver gear to the back gear without taking the on state of the operational switch for quick angle adjustment S2 into account. The mirror can be inclined to the reverse position only when the driver turns off the operational switch for quick angle adjustment S2 once and then turns on the switch again.

Consequently, the mirror can be prevented from accidental automatic inclination to the reverse position against the driver's intention.

DESCRIPTION OF THE PREFERRED EMBODIMENTS

Figure 1:
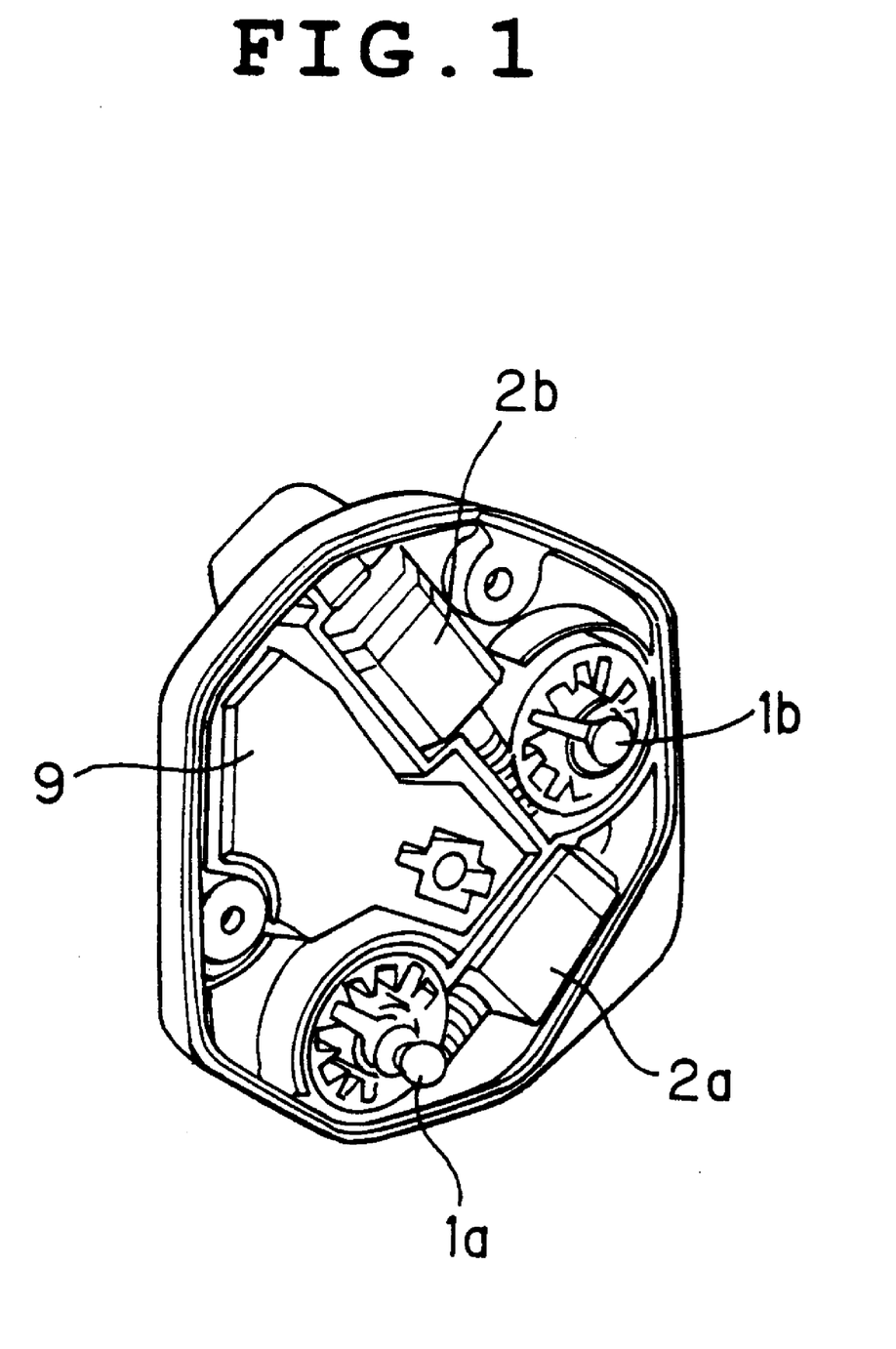
FIG. 1 is a perspective view illustrating configuration of a mirror angle adjusting actuator which includes a quick angle adjusting mechanism to which applied is a control device for quick angle adjustment of a rearview mirror of the present invention.

FIG. 1 is a perspective view illustrating configuration of a mirror angle adjusting actuator which includes a quick angle adjusting mechanism to which applied is a control device for quick angle adjustment of a rearview mirror of the present invention. The actuator shown in FIG. 1 is mounted on a backside of a mirror of a rearview mirror of a vehicle. According to rotation of drive motors 2a and 2b, Pivots 1a and 1b which abut to appropriate points on a vertical direction to the axis of the mirror and on a transverse direction to the axis, respectively, make advancing/retracting action, so that the mirror can be adjusted to the desired angle by means of motor operation.

Figure 2:
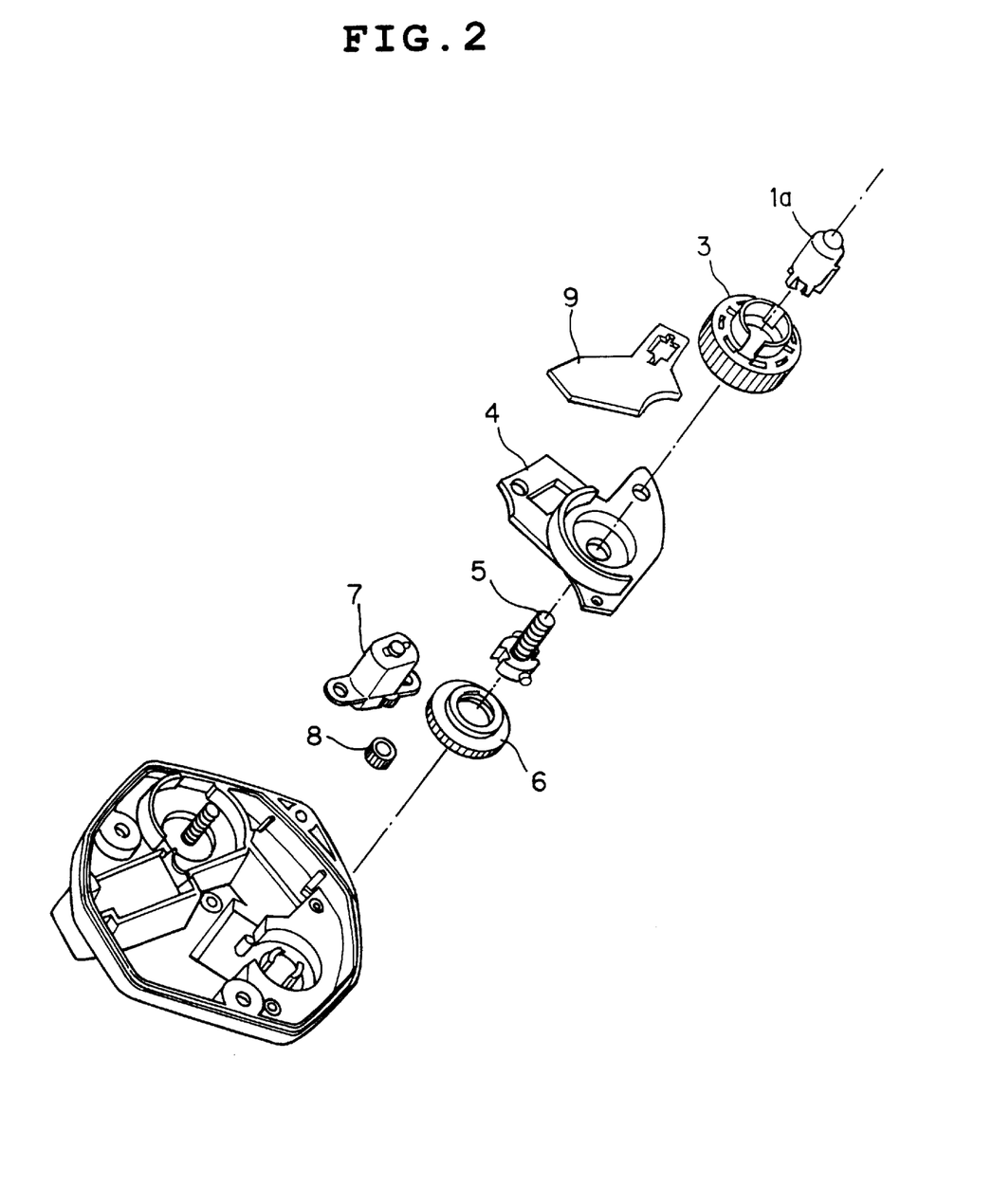
FIG. 2 is an exploded perspective view of the quick angle adjusting mechanism of the mirror angle adjusting actuator.

As an exploded view of FIG. 2 shows, at a base portion of the pivot 1a there is provided a warm wheel 3, an intermediate plate 4, a slide member 5, a quick angle adjusting gear 6, and a quick angle adjusting motor 7, for fine adjustment of the pivot 1a. As a result, a tilt angle of the mirror can be changed quickly and radically. In other words, rotation of the quick angle adjusting motor 7, in turn rotates the quick angle adjusting gear 6 via a gear 8. This moves the slide member 5 forward and backward quickly and the pivot 1a also inevitably moves forward and backward quickly, so that the inclination of the mirror can be altered quickly. Thus, the rearview mirror can be tilted quickly to reflect the vicinity of a rear wheel part of the vehicle, for example, in case of driving a vehicle back into a garage. On the other hand, the mirror can be returned to its normal or original position easily, quickly once the vehicle is in place in the garage (hereinafter, this returned position is referred to as a normal position). In this way, the control of the mirror angle is easy. In addition, the control device for quick angle adjustment of a rearview mirror, which is a subject of the present invention, is mounted on a substrate 9 illustrated in FIGS. 1 and 2.

Figure 3:
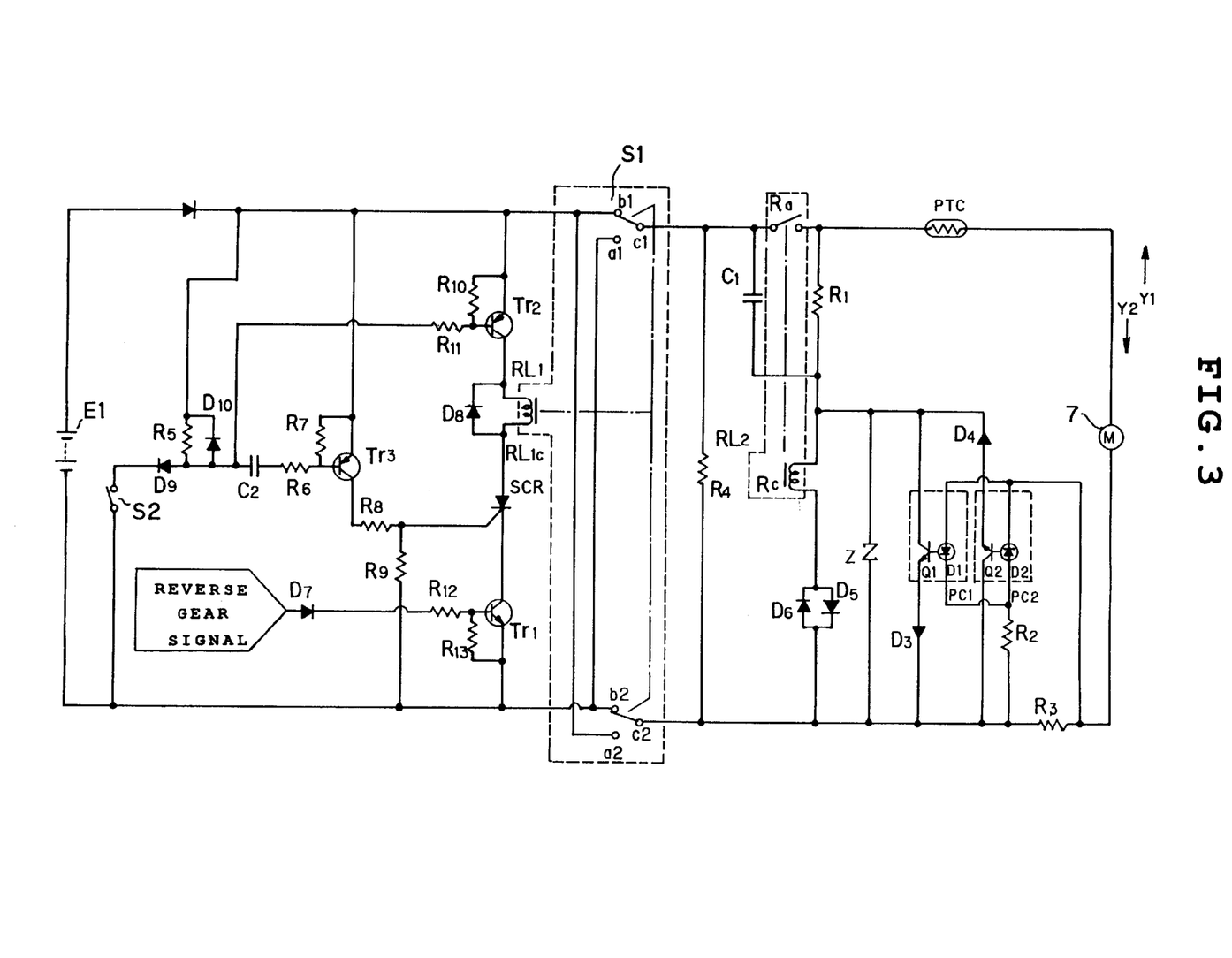
FIG. 3 is an explanatory view illustrating a circuit configuration of a control device for quick angle adjustment of a rearview mirror according to an embodiment of the present invention.

FIG. 3 is an explanatory view illustrating a circuit configuration of a control device for quick angle adjustment of a rearview mirror according to an embodiment of the present invention. As illustrated in FIG. 3, the control device comprises a direct current power supply E1 from a vehicle-mount battery and a reversible switch S1 for use in making polarity of the direct current power supply E1 reversible. Contacts of the reversible switch S1 can be switched in response to ON and OFF states of a relay RL1 described below. A contact point a1 is connected to a contact point c1 and a contact point a2 is connected to a contact point c2 when a current flows through an exciting coil RL1c to conduct the relay RL1. (This status is referred to as a forward direction connection hereinafter.) When the exciting coil RL1 is turned OFF, contact points b1 and c1 are connected each other and contact points b2 and c2 are connected each other. (This status is referred to as a reverse direction connection hereinafter.) The quick angle adjusting motor 7 is connected to an output side of the reversible switch S1. Furthermore, make contact Ra for a relay RL2 described below and a resistance PTC for current control are connected between the contact point c1 and the motor 7. An insert resistance R3 is connected between the contact point c2 and the motor 7 for the purpose of voltage detection.

A diode D11 is connected between a positive terminal of the direct current power supply E1 and the reversible switch S1. A cathode side of the diode D11 is connected to the contact points b1 and b2. The cathode side is further branched into three lines. Of these, a first branch is connected to a negative terminal of the direct current power supply E1 via a transistor Tr2 (a second switch), the exciting coil RL1c of the relay RL1 (a first relay circuit), a thyristor SCR (a fourth switch), and a transistor Tr1 (a first switch). A diode D8 of a reverse polarity is connected in parallel to the relay coil RL1c. Furthermore, a base terminal of the transistor Tr1 is supplied with a reverse gear signal via a resistance R12 and a diode D7. The reverse gear signal is produced in response to displacement of the shift lever of the vehicle to the reverse gear. A resistance R13 is connected between an emitter and the base of the transistor Tr1.

For the second branch, it is further branched into two lines via a transistor Tr3 (a third switch) and a resistance R8. Of these two "sub-branches", one is connected to the gate terminal of the thyristor SCR and the other to the negative terminal of the direct current power supply E1 through a resistance R9. A base terminal of the transistor Tr3 is connected to the negative terminal of the direct current power supply E1 via a resistance R6, a condenser C2, a diode D9, and the operational switch for quick angle adjustment S2. Furthermore, the junction between the condenser C2 and the diode D9 is connected to the base of the transistor Tr2 via a resistance R11. A resistance R10 is connected between the base and an emitter of the transistor Tr2. A resistance R7 is connected between the base and the emitter of the transistor Tr3.

The third branch is connected to the junction between the condenser C2 and the diode D9 via a parallel connection circuit between the resistance R5 and the diode D10.

The resistance R4 is connected between the output contact points c1 and c2 of the reversible switch S1. The resistance R1, the exciting coil Rc of the relay (the second relay circuit) RL2, and a parallel connection of two diodes D5 and D6 having opposite polarity are connected in series between a negative side of the make contact Ra and the contact point c2. The junction between the resistance R1 and the relay coil Rc is connected to a power supply side of the make contact point Ra via the condenser C1.

Between a junction of the resistance R1 and the relay coil Rc and the contact point c2, connected is a parallel connection circuit of a serial connection of a photo transistor Q1 and the diode D3, and a serial connection of the diode D4 and a photo transistor Q2. Both ends of the resistance R3 are connected to a parallel connection of the photo diodes D1 and D2 disposed in opposite direction and a serial connection with the resistance R2. A photo coupler PC1 is formed of the photo diode D1 and the photo transistor Q1. Likewise, a photo coupler PC2 is formed of the photo diode D2 and the photo transistor Q2.

Next, the embodiment described above are operated as follows: When the shift lever of a vehicle is displaced into the reverse gear position, for example, in case of putting a vehicle into a garage, the indicative signal is transmitted to the base of the transistor Tr1 via the diode D7. In response to this, the transistor Tr1 turns ON. In other words, connection is established between the collector and emitter of the transistor Tr1. Next, when the operational switch for quick angle adjustment S2 is turned ON, the cathode of the diode D9 is conducted to the negative terminal of the direct current power supply E1, and thus, an electrical current flows through E1, D11, R10, R11, and D9. In this event, the current flows across the base of the transistor Tr2, which means conducting of the transistor Tr2. A charge current flows across the condenser C2 via E1, D11, R7, and R6, which provides an instantaneous current flow across the base of the transistor Tr3 so that the transistor T3 is conducted during this momentary period of time.

As a result, a trigger current is supplied to a gate of the thyristor SCR, which means that the thyristor is kept conducting and Tr2, SCR, and Tr1 are all conducted, so that the coil RL1c of the relay RL1 is excited and thus the two contacts of the reversible switch S1 are switched. In other words, the contact point a1 is connected to the contact point c1 while the contact point a2 is connected to the contact point c2 (the forward direction connection). This compels the current to flow through the condenser C1 via D11, a2, c2, D6, and Rc, so as to charge the condenser C1 Since the relay coil Rc is being excited during the charge, the make contact point Ra tunes ON and the relay RL2 is inevitably self-held. Consequently, the current flows across the quick angle adjusting motor 7 in a direction depicted by an arrow Y1 in the figure. The pivot a1 shown in FIG. 2 moves forward and backward accordingly so that the tilt angle of the mirror changes quickly and radically to the reverse position. In this state, the vicinity of the rear wheel part is reflected in the rearview mirror.

When the mirror reaches to the reverse position, the quick angle adjusting motor 7 is compelled to stop rotating, which increases a load on the motor so that an over-current flows across the quick angle adjusting motor 7. The voltage across the both ends of the insert register R3 increases accordingly, which results that the current level flowing across the resistance R2 and the photo diode D2 also increases so as to turn ON the photo transistor Q2. In response to this, the fact that the both ends of the relay coil Rc are short circuited due to the circuit formed of the photo transistor Q2 and the diode D4 means that the excision of the relay coil is released and thus the make contact point Ra is disconnected due to release of self-hold. Accordingly, the quick angle adjusting motor 7 comes to stop.

When the driver turns ON the operational switch for quick angle adjustment S2 or the displaces the shift lever from the reverse gear position to another gear position, under the above-mentioned status, the transistor Tr2 or the transistor Tr1 turns OFF and the electrical current across the relay coil RL1c is removed. As a result, the contact point of the reversible switch S1 returns to its original position. In other words, the contact point b1 is connected to the contact point c1, while the contact point b2 is connected to the contact point c2 (the reverse direction connection). Accordingly, the current flows through the condenser C1, the relay coil Rc, and the diode 5S to charge the condenser C1 so that the relay coil Rc is self-held, and then the current flows across the quick angle adjusting motor 7 in a direction depicted by an arrow Y2 in the figure. Consequently, the quick angle adjusting motor 7 rotates in an opposite direction to the preceding direction, which makes the mirror angle return to its normal position. When the mirror angle completely returns to its normal position, the relay RL2 is now disconnected by the operation of the photo coupler PC1 so that the self-hold is eliminated so as to disconnect the supply of the voltage to the quick angle adjusting motor 7. In this way, the operational switch for quick angle adjustment S2 is used to change the tilt angle of the mirror quickly and radically to the reverse position, or vise versa.

When the shift lever is displaced to the position of the reverse gear while the operational switch for quick angle adjustment S2 is kept ON, the transistors Tr1 and Tr2 turn ON while the transistor Tr3 does not turn ON instantaneously because the condenser C2 has been already charged. The thyristor SCR is not triggered accordingly. Therefore, the coil RL1c of the relay RL1 is not excited and the reversible switch S1 is not switched so that the quick angle adjusting motor 7 does not rotate. In this way, when the driver displaces the shift lever to the reverse gear position without turning off the operational switch for quick angle adjustment S2, the inclination of the mirror does not change, and thus, the tilt angle of the mirror never moves against the driver's intention. To activate the quick angle adjusting motor 7, the operational switch for quick angle adjustment S2 is once turned OFF and then is turned on again.

In this embodiment, thus, the inclination of the mirror is quickly changed only when the shift lever is displaced to the reverse gear position and then the operational switch for quick angle adjustment S2 is turned ON, which prevents the mirror from unexpectedly moving to the reverse position in response to the gear change to the reverse gear position, for example, when a vehicle is simply reversed. That is, the angle of the mirror can be changed radically, easily and accurately only when the driver requires. In addition, because the mirror can be returned to its normal position by displacing the shift lever from the reverse gear position to the drive gear position, or by turning OFF the operational switch for quick angle adjustment S2, good operation can be accomplished. Furthermore, the fact that any complex circuit such as a microcomputer is not used means that simple construction, less costs and less potential of a trouble or a damage can be carried out.

Figure 4:
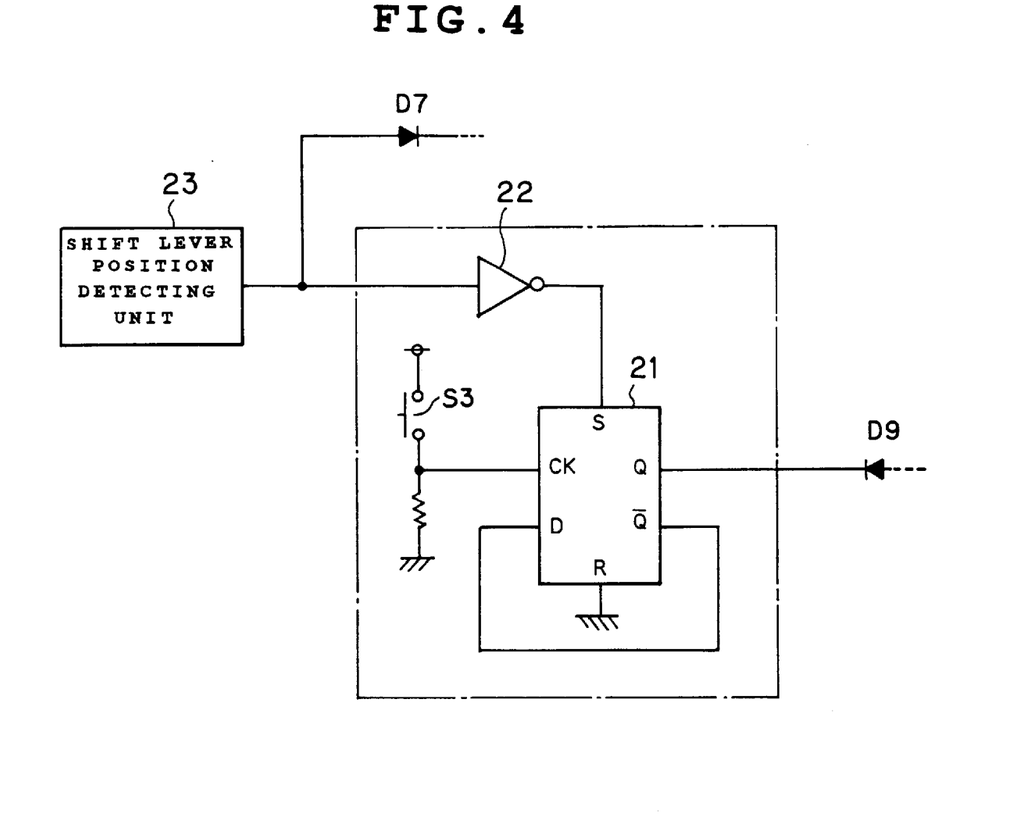
FIG. 4 is an explanatory view of a circuit similar to the one in FIG. 3, with a momentary switch and a flip flop circuit used in place of an operational switch for quick angle adjustment S2 in FIG. 3.

FIG. 4 is a modified configuration of the above-mentioned embodiment. This modification is different from the above embodiment in that a momentary switch S3, a D flip flop 21 and an inverter 22 are used in place of the operational switch for quick angle adjustment S2. More specifically, a signal from a shift lever position detecting unit 23, which is adapted to detect a set position for the shift lever, is supplied to the inverter 22. An output of the inverter 22 is supplied to a SET input of the D flip flop (hereinafter, referred to as F/F) 21. A clock input CK of the F/F 21 is connected to the power supply through a switch S3 which is a momentary type. A RESET input is connected to a ground. A reverse output Q-bar is connected to a DATA input. An output Q is connected to the cathode of the diode D9 shown in FIG. 3.

Figure 5:
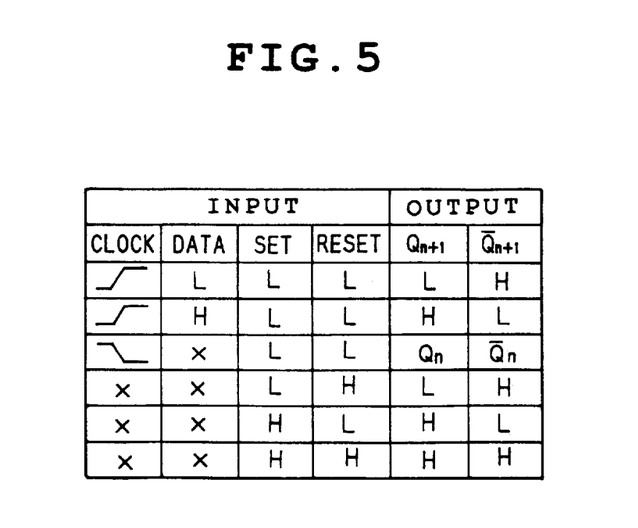
FIG. 5 is an explanatory view for use in describing a truth table for a D flip flop circuit.

The inverter 21 may be achieved by, for example, μPC4069UB while the D flip flop 21 may be achieved by, for example, μPD4013B. FIG. 5 is a truth table of the μPD4013B. Referring to this figure, operation of the modified embodiment is now described. When the shift lever of the vehicle is not in the reverse gear position, the shift lever position detecting unit 23 produces a low level (hereinafter referred to as "L") signal. The output of the inverter 22 is thus at a high level (hereinafter referred to as "H").

Therefore, the SET of the F/F 21 is supplied with the "H" level signal while the RESET is constantly at the "L" level. Accordingly, the output Q becomes "H" level according to the truth table shown in FIG. 5. The cathode side of the diode 9 shown in FIG. 3 thus becomes "H" level so that the transistors Tr2 and Tr3 turn OFF. The output of the shift lever position detecting unit 23 is at the "L" level, so that the transistor Tr1 also turns OFF.

When the momentary switch S3 is turned ON under the above-mentioned status, the output Q does not change because the SET input of the F/F 21 retains "H" level. When the shift lever is displaced to the reverse gear position, the output of the shift lever position detecting unit 23 becomes "H" level, and thus the SET input of the F/F 21 through the inverter 22 becomes "L" level. Next, when the switch S3 is turned ON while the CLOCK is "rise" and all of the DATA, SET, and RESET is at the "L" level, the output Q becomes "L" level according to the truth table. Therefore, the cathode side of the diode D9 in FIG. 3 becomes "L" level so that the quick angle adjusting motor 7 rotates in the direction so as to tilt the mirror to reflect the vicinity of the rear wheel part (reverse position).

When the switch S3 is turned ON again, the DATA input becomes "H" level and the output Q becomes "H" level according to the truth table. This turns OFF the transistor Tr2 shown in FIG. 3, so that the mirror returns to its normal position by the quick angle adjusting motor 7. In other words, the tilt angle of the mirror changes to the reverse position by means of depressing the switch S3 while the shift lever is at the reverse gear position. Further, the fact that it returns to its normal position by depressing the switch S3 again means that the operation is further improved as compared with the above-mentioned embodiment.

Figure 6:
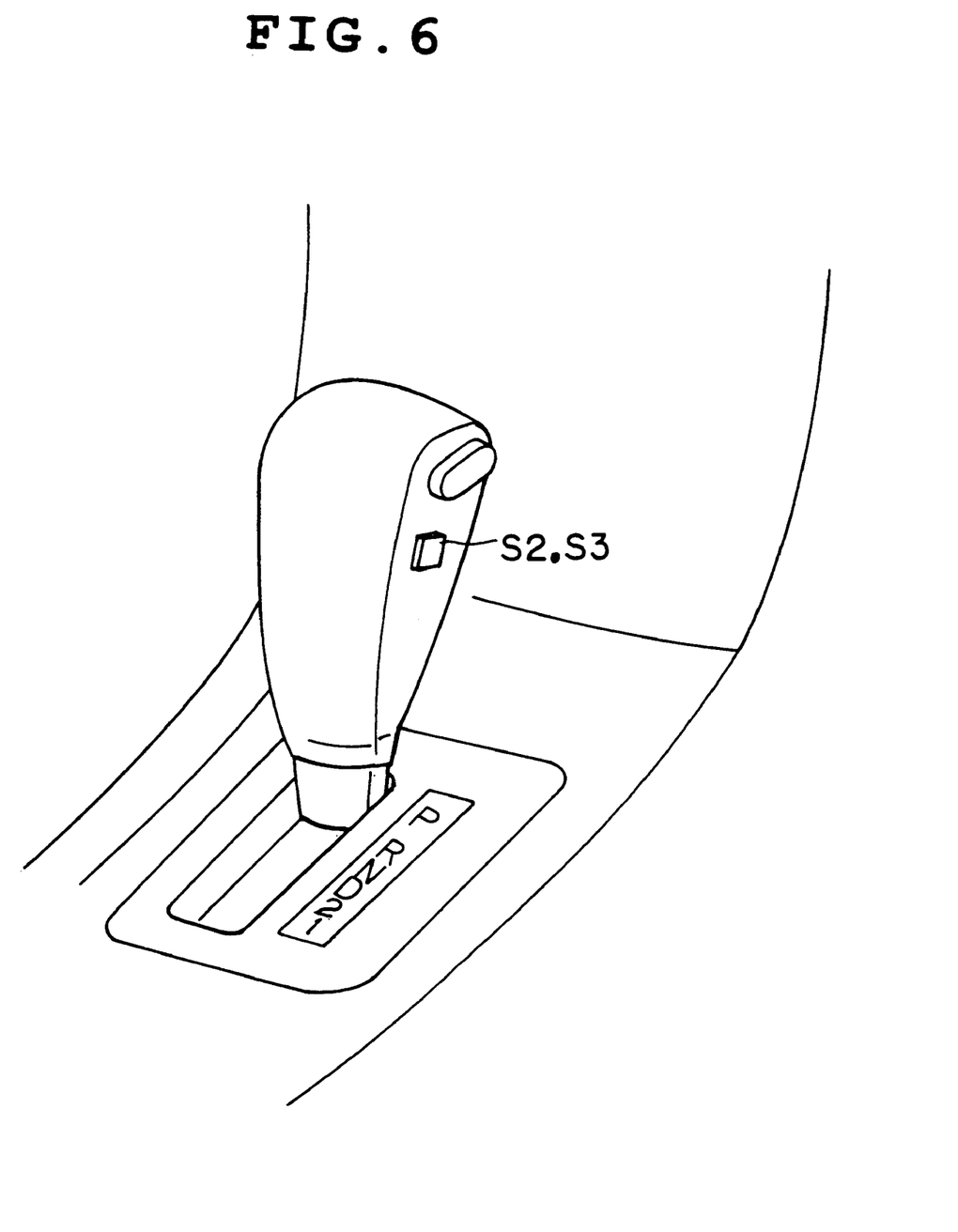
FIG. 6 is a view for use in describing the state of an operational switch for quick angle adjustment arranged around a side of a shift lever provided in a vehicle.

The driver can easily operate the switches S2 and S3 when the operational switch for quick angle adjustment S2 or the momentary switch S3 is placed on the side of the shift lever in the vehicle as shown in FIG. 6.

As described above, in the control device for quick angle adjustment of a rearview mirror of the present invention, the mirror is tilted to the reverse position to reflect the vicinity of the rear wheel part only when the operational switch for quick angle adjustment is operated after the shift lever is displaced to the reverse gear position. The inclination of the mirror can thus be controlled accurately according to the driver's intention. The fact that the tilt angle of the mirror automatically returns to its normal position by means of displacing the shift lever from the reverse gear position to any other position or by means of turning OFF the operational switch for quick angle adjustment means that the tilt angle of the mirror can return easily, accurately and radically. In addition, because the mirror does not move when the shift lever is displaced to the reverse gear position while the operational switch for quick angle adjustment is in the ON state, unnecessary angle adjustment can be avoided.

Further, the operational switch for quick angle adjustment mounted on the side of the shift lever in the vehicle allows the driver to turn ON and OFF the operational switch for quick angle adjustment in series of the operation to select the reverse gear, which improves the operation of the device.

When the operational switch for quick angle adjustment is configured with the momentary switch and the flip flop circuit, the tilt angle of the mirror can be changed quickly by turning ON the momentary switch after the reverse gear is selected while the tilt angle of the mirror can be returned to its normal position by turning ON the momentary switch again. Accordingly, the operation of the device can be further improved. In addition, the device is advantageous in view of storage because it can be mounted on the substrate in the actuator.

We claim:

1. A control device for quick angle adjustment of a rearview mirror for controlling a quick angle adjusting mechanism which quickly changes a tilt angle of a mirror of a rearview mirror assembly for a vehicle so as to move the mirror between a normal position and a reverse position, the control device comprising:

a direct current power supply for generating a direct current voltage;

a quick angle adjusting motor for use in changing quickly and radically the tilt angle of the mirror;

a reversible switch connected between said direct current power supply and said quick angle adjusting motor, said reversible switch being adapted to invert a direct current voltage from said direct current power supply in a forward or reverse direction to supply it to said quick angle adjusting motor;

an operational switch for quick angle adjustment for use in operating said quick angle adjusting motor;

reverse gear recognition means mounted on the vehicle to detect that a shift lever for changing gear positions is at a position corresponding to a reverse gear;

a reversible switch circuit that connects said reversible switch in the forward direction only when said quick angle adjusting switch is turned ON after said reverse gear recognition means detects the shift lever is at the position corresponding to the reverse gear, and otherwise said reversible switch circuit connecting said reversible switch in the reverse direction; and a rotation control circuit that rotates said quick angle adjusting motor towards a reverse position side when said reversible switch is connected in the forward direction, and rotates said quick angle adjusting motor towards a normal position side when said reversible switch is connected in the reverse direction while said rotation control circuit disconnecting supply of a voltage to said quick angle adjusting motor when each rotation operation is terminated.

2. A control device as defined in claim 1, wherein said rearview mirror assembly comprises a mirror angle adjusting actuator having a substrate, said rotation control circuit is mounted on the substrate.

3. A control device as defined in claim 1, wherein said reversible switch circuit comprises:

a first switch that turns ON in response to selection of the reverse gear;

a second switch that turns ON in response to the turning ON of said operational switch for quick angle adjustment;

a third switch that turns ON instantaneously in response to the turning ON of said operational switch for quick angle adjustment;

a fourth switch of a self-hold type that retains ON-state continuously in response to a signal obtained when the state of the third switch becomes ON instantaneously; and a first relay circuit connected to the first switch, the second switch, and the fourth switch, via said direct current power supply, wherein the first relay circuit is conducted when all of the first, second, and fourth switches turns ON so as to connect said reversible switch in the forward direction, while the first relay circuit is disconnected when at least one of the first, second and fourth switches turns OFF so as to connect said reversible switch in the reverse direction.

4. A control device as defined in claim 1, wherein said rotation control circuit comprises:

a second relay circuit that is self-held in response to detection of a voltage fluctuation according to switching of said reversible switch, so as to connect said reversible switch to said quick angle adjusting motor;

an insert resistance connected in series to said quick angle adjusting motor; and voltage monitoring means for monitoring a voltage across both ends of the insert resistance to stop supply of the voltage to said quick angle adjusting motor by means of disconnecting the second relay circuit when a monitored voltage value exceeds a predetermined threshold value.

5. A control device as defined in claim 1, wherein said quick angle adjusting switch is mounted around the side of the shift lever.

6. A control device as defined in claim 1, wherein said operational switch for quick angle adjustment is formed of at least a momentary switch and a flip flop circuit.

* * * * *